(12) United States Patent
York et al.

(10) Patent No.: US 9,746,307 B2
(45) Date of Patent: Aug. 29, 2017

(54) COORDINATE MEASUREMENT MACHINE WITH CONFIGURABLE ARTICULATED ARM BUS

(71) Applicant: FARO Technologies, Inc, Lake Mary, FL (US)

(72) Inventors: Frederick John York, Longwood, FL (US); Yu Gong, Orlando, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 218 days.

(21) Appl. No.: 14/868,974

(22) Filed: Sep. 29, 2015

(65) Prior Publication Data
US 2016/0097629 A1  Apr. 7, 2016

Related U.S. Application Data

(60) Provisional application No. 62/060,866, filed on Oct. 7, 2014.

(51) Int. Cl.
*G01B 7/008* (2006.01)
*G01B 21/04* (2006.01)

(52) U.S. Cl.
CPC ............. *G01B 7/008* (2013.01); *G01B 21/04* (2013.01)

(58) Field of Classification Search
CPC ............. G01B 7/00; G01B 21/04; B25J 19/02
USPC ........... 33/503; 702/150, 151, 152, 153, 168
See application file for complete search history.

(56) References Cited

U.S. PATENT DOCUMENTS

| | | | | |
|---|---|---|---|---|
| 4,916,643 | A * | 4/1990 | Ziegler et al. ......... | G08C 15/00 340/870.17 |
| 5,402,582 | A * | 4/1995 | Raab ...................... | G01B 5/008 33/1 PT |
| 5,412,880 | A | 5/1995 | Raab | |
| 7,591,078 | B2 * | 9/2009 | Crampton ............. | B25J 13/088 33/503 |
| 9,429,416 | B2 * | 8/2016 | Kocic et al. ......... | G01B 11/005 |
| 2004/0172215 | A1 * | 9/2004 | Russell .................. | G01B 21/04 702/167 |
| 2007/0032951 | A1 * | 2/2007 | Tanenhaus et al. .... | G01C 21/16 702/151 |
| 2008/0235970 | A1 | 10/2008 | Crampton | |
| 2011/0178764 | A1 * | 7/2011 | York ...................... | G01B 5/008 702/152 |
| 2014/0101953 | A1 | 4/2014 | Briggs et al. | |

(Continued)

OTHER PUBLICATIONS

International Search Report and Written Opinion for International Application No. PCT/US2015/053067 dated Nov. 30, 2015; Mailed Dec. 15, 2015; 11 pages.

*Primary Examiner* — R. A. Smith
(74) *Attorney, Agent, or Firm* — Cantor Colburn LLP

(57) ABSTRACT

An articulated arm coordinate measurement machine is provided with a configurable arm bus. The arm bus being comprised of a plurality of busses that may be selectively coupled to form one or more logical data communications busses. The logical busses may be configured to allow accessory devices to be coupled to the arm and transmit data at higher speeds and at lower costs than may be possible using data busses having fixed communications protocols. In one embodiment, one or more communications switches may be arranged in the probe end of the arm to selectively combine the busses into a logical bus.

18 Claims, 13 Drawing Sheets

(56) References Cited

U.S. PATENT DOCUMENTS

2015/0159993 A1\* 6/2015 Kocic et al. ......... G01B 11/005
                                                          356/51

\* cited by examiner

US 9,746,307 B2

COORDINATE MEASUREMENT MACHINE WITH CONFIGURABLE ARTICULATED ARM BUS

CROSS-REFERENCE TO RELATED APPLICATIONS

The present Application is a Nonprovisional Application of U.S. Provisional Application Ser. No. 62/060,866, filed on Oct. 7, 2014, the contents of which are incorporated by reference herein in their entirety.

BACKGROUND

The present disclosure relates to a coordinate measuring machine and more particularly to a portable articulated arm coordinate measuring machine having a bus that is selectively configurable to operate with multiple data protocols.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 (582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 (147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Three-dimensional surfaces may be measured using non-contact techniques as well. One type of non-contact device, sometimes referred to as a laser line probe, emits a laser light either on a spot, or along a line. An imaging device, such as a charge-coupled device (CCD) for example, is positioned adjacent the laser to capture an image of the reflected light from the surface. The surface of the object being measured causes a diffuse reflection. The image on the sensor will change as the distance between the sensor and the surface changes. By knowing the relationship between the imaging sensor and the laser and the position of the laser image on the sensor, triangulation methods may be used to measure points on the surface.

While existing CMM's are suitable for their intended purposes, what is needed is a portable AACMM that has certain features of embodiments of the present invention.

SUMMARY OF THE INVENTION

In accordance with one embodiment of the invention, a system for measuring three-dimensional coordinates of an object in space is provided. The system includes an portable articulated arm coordinate measuring machine (AACMM) in a AACMM frame of reference having an origin, the AACMM having a manually positionable arm portion, a base, a noncontact measurement device, and an electronic circuit, the arm portion having an opposed first end and second end, the arm portion including a plurality of connected arm segments, each of the plurality of connected arm segments including at least one position transducer for producing a plurality of position signals, the first end connected to the base. A first electronic circuit is configured for receiving the position signal from the at least one position transducer and for providing data corresponding to a position of the measurement device, the first electronic circuit having a first processor. A second electronic circuit is disposed within the second end, the second electronic circuit having a second processor, a first communications switch and a second communications switch. A first data bus is coupled between the first electronic circuit and the second electronic circuit, the first data bus configured to operate on a first communications protocol. A second data bus is coupled between the first electronic circuit and the second electronic circuit. A third data bus is coupled between the first communications switch and the first electronic circuit. A fourth data bus is coupled between the second communications switch and the first electronic circuit. A noncontact measurement device is coupled to the second end and electrically coupled to the second electronic circuit. Wherein the first communications switch and the second communications switch are configured to operably couple the second data bus, the third data bus and the fourth data bus into a single logical data bus in response to a second signal, the single logical data bus configured to operate on a second communications protocol, the second communications protocol being different than the first communications protocol.

In accordance with one embodiment of the invention, A method of operating a portable articulated arm coordinate measuring machine (AACMM) for measuring three-dimensional coordinates of an object in space, comprising: providing the AACMM in a AACMM frame of reference having an origin, the AACMM having a manually positionable arm portion, a base, a noncontact measurement device, and an electronic circuit, the arm portion having an opposed first end and second end, the arm portion including a plurality of connected arm segments, each of the plurality of connected arm segments including at least one position transducer for producing a plurality of position signals, the first end connected to the base; providing a first electronic circuit configured for receiving the position signal from the at least one transducer and for providing data corresponding to a position of the measurement device, the first electronic circuit having a first processor; providing a second electronic circuit disposed within the second end, the second electronic circuit having a second processor, a first communications switch and a second communications switch; providing a first data bus coupled between the first electronic circuit and the second electronic circuit, the first data bus configured to operate on a first communications protocol;

providing a second data bus coupled between the first electronic circuit and the second electronic circuit; providing a third data bus coupled between the first communications switch and the first electronic circuit; providing a fourth data bus coupled between the second communications switch and the first electronic circuit; coupling an accessory device to the second end; receiving a first identification signal at the first communications switch and the second communications switch; switching the first communications switch and the second communications switch to couple the second data bus, the third data bus and the fourth data bus into a single logical data bus in response to the first identification signal, the single logical data bus configured to operate on a second communications protocol, the second communications protocol being different than the first communications protocol.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DETAILED DESCRIPTION

Portable articulated arm coordinate measuring machines ("AACMM") are used in a variety of applications to obtain measurements of objects. Embodiments of the present invention provide advantages in allowing an operator to easily and quickly couple accessory devices that use structured light to a probe end of the AACMM to provide for the non-contact measurement of a three-dimensional object. Embodiments of the present invention provide further advantages in providing for communicating data representing a distance to an object measured by the accessory. Embodiments of the present invention provide still further advantages in providing power and data communications to a removable accessory without having external connections or wiring. Embodiments of the present invention further provide for a selectively configurable logical data bus that may be operated under different communications protocols in response to the accessory coupled to the probe end. Still further embodiments of the invention provide for a power supply having redundant energy sources that allows for replacement of an energy source without interrupting operation of the AACMM.

Figure 1:
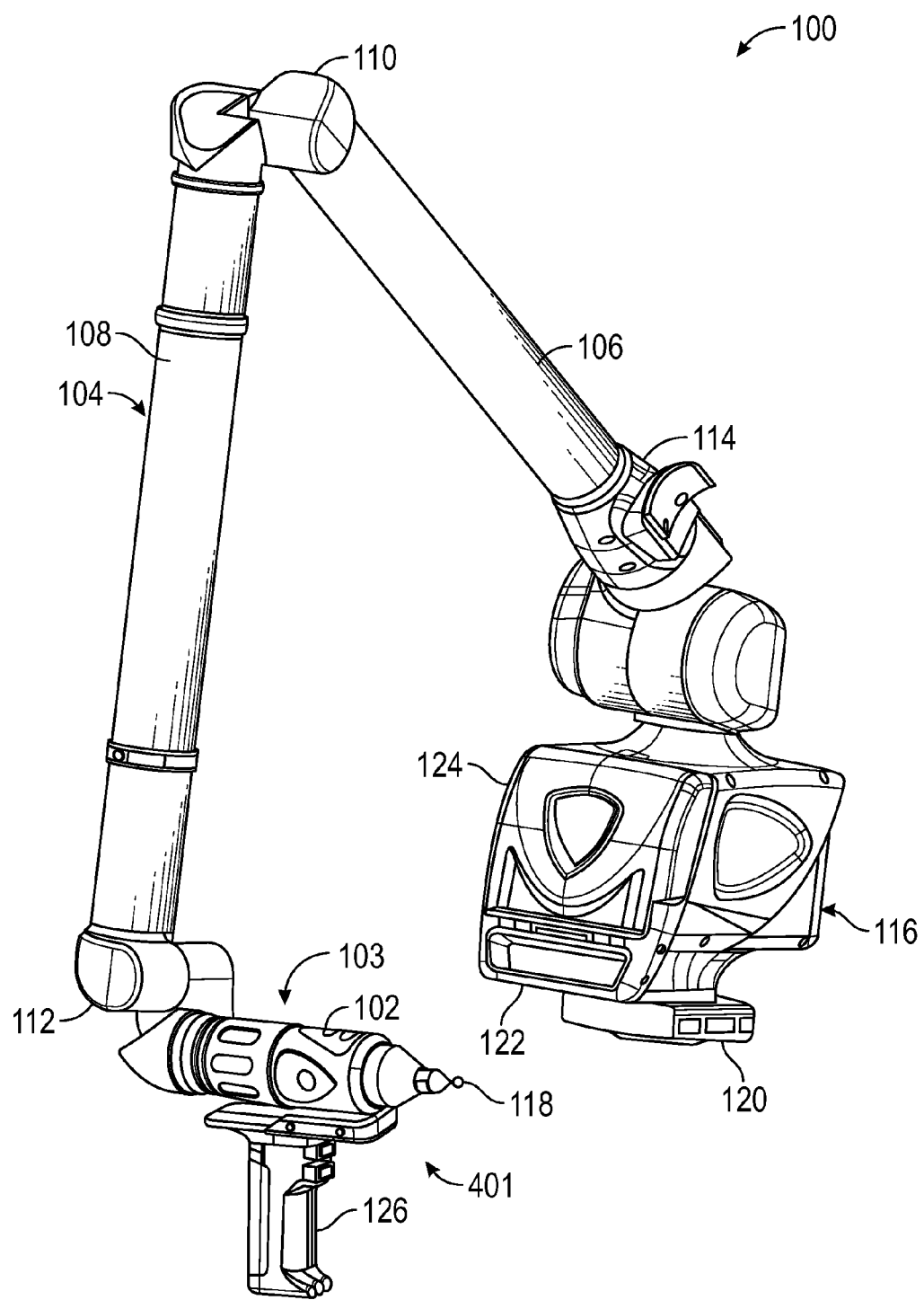
FIG. 1 and FIG. 2 are perspective views of a portable articulated arm coordinate measuring machine (AACMM) having embodiments of various aspects of the present invention therewithin.
Figure 2:
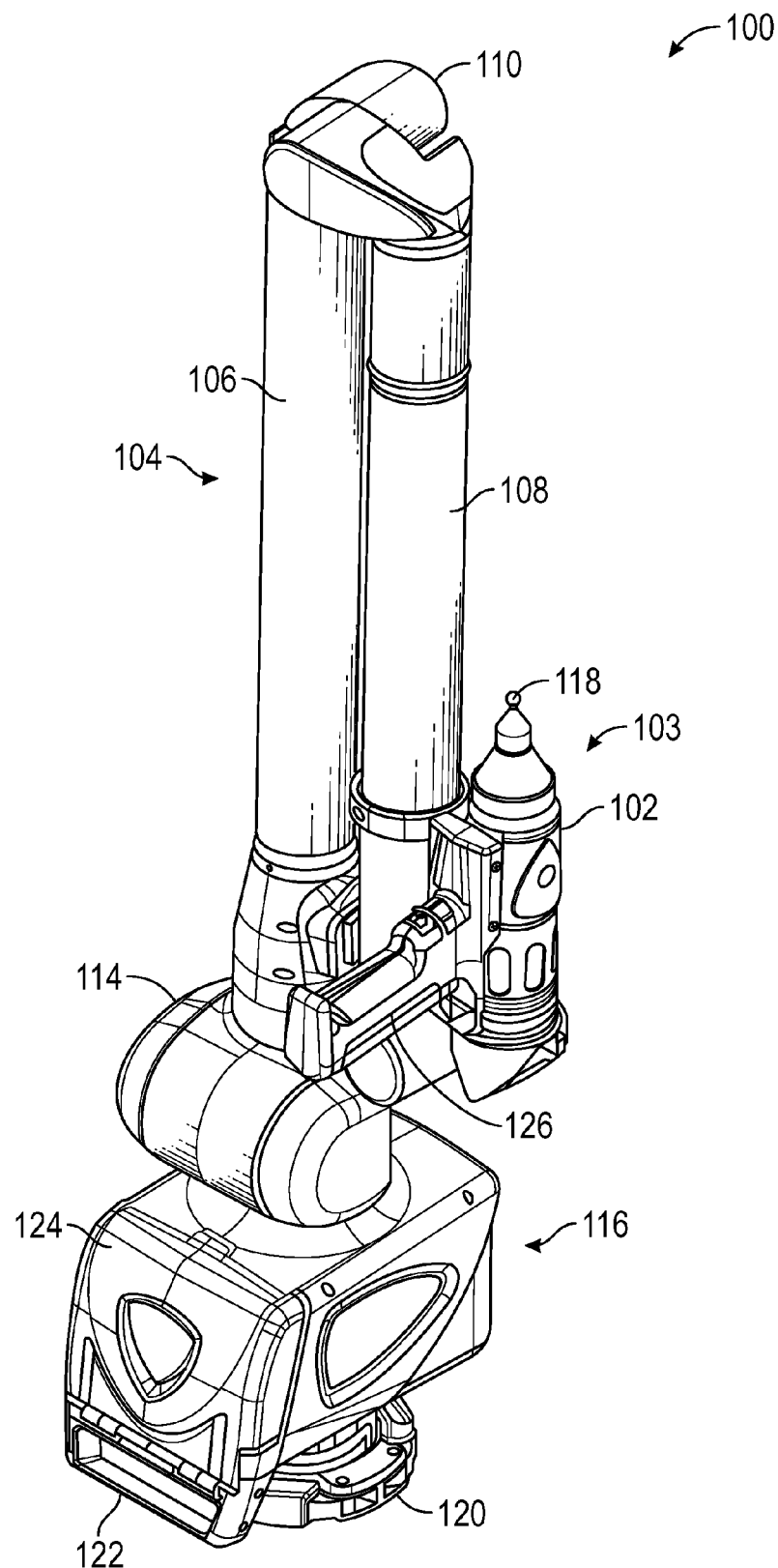

FIGS. 1 and 2 illustrate, in perspective, an AACMM 100 according to various embodiments of the present invention, an articulated arm being one type of coordinate measuring machine. As shown in FIGS. 1 and 2, the exemplary AACMM 100 may comprise a six or seven axis articulated measurement device having a probe end 103 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 103 may include a measurement probe housing 102 that comprises the shaft of an axis of rotation for the AACMM 100 (e.g., a cartridge containing an encoder system that determines movement of the measurement device, for example a probe 118, in an axis of rotation for the AACMM 100). In this embodiment, the probe end 103 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

Figure 10:
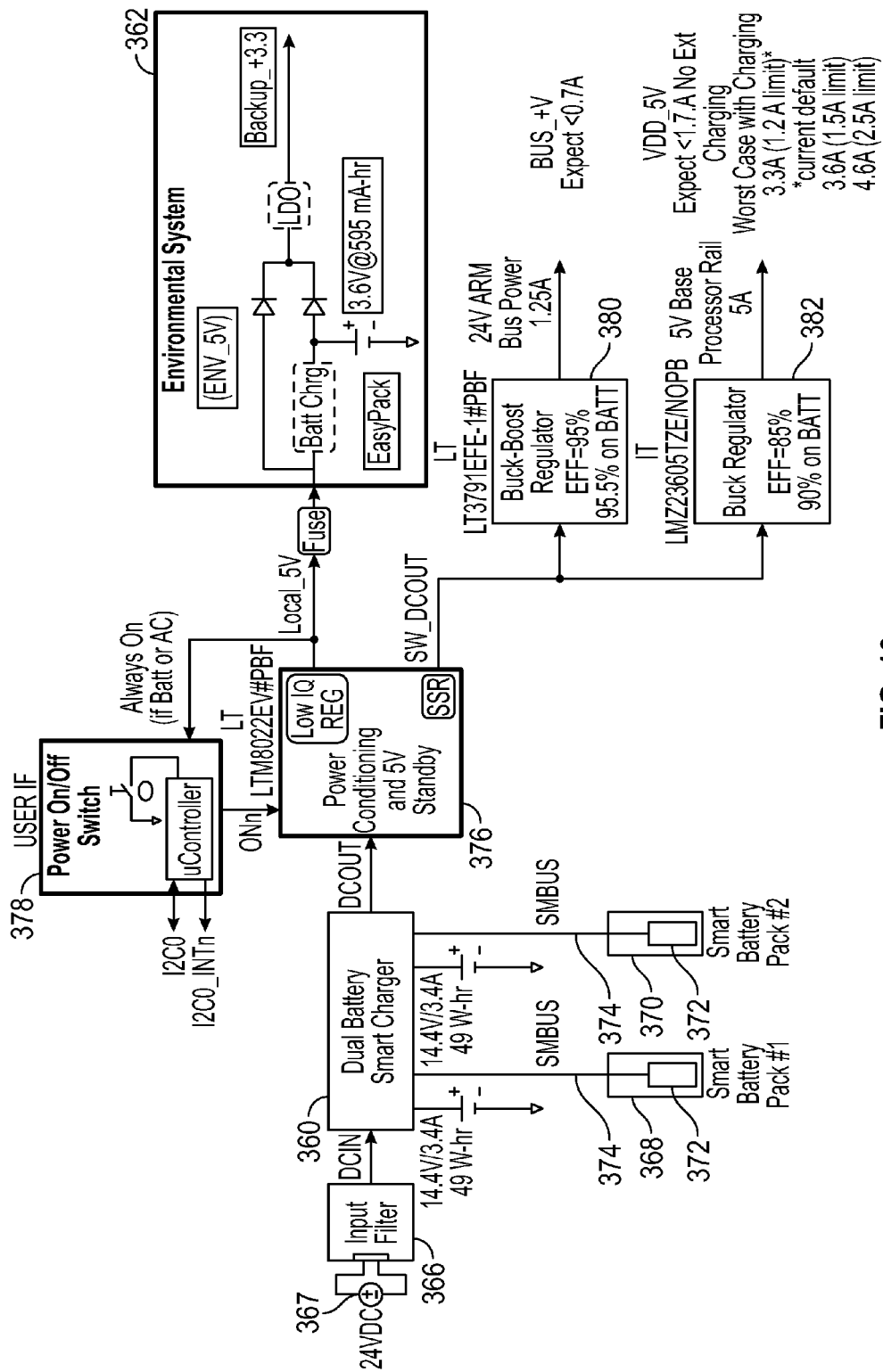
FIG. 10 is a block diagram of a power supply having a redundant energy source for use with the AACMM of FIG. 1 in accordance with an embodiment of the invention.
Figure 12:
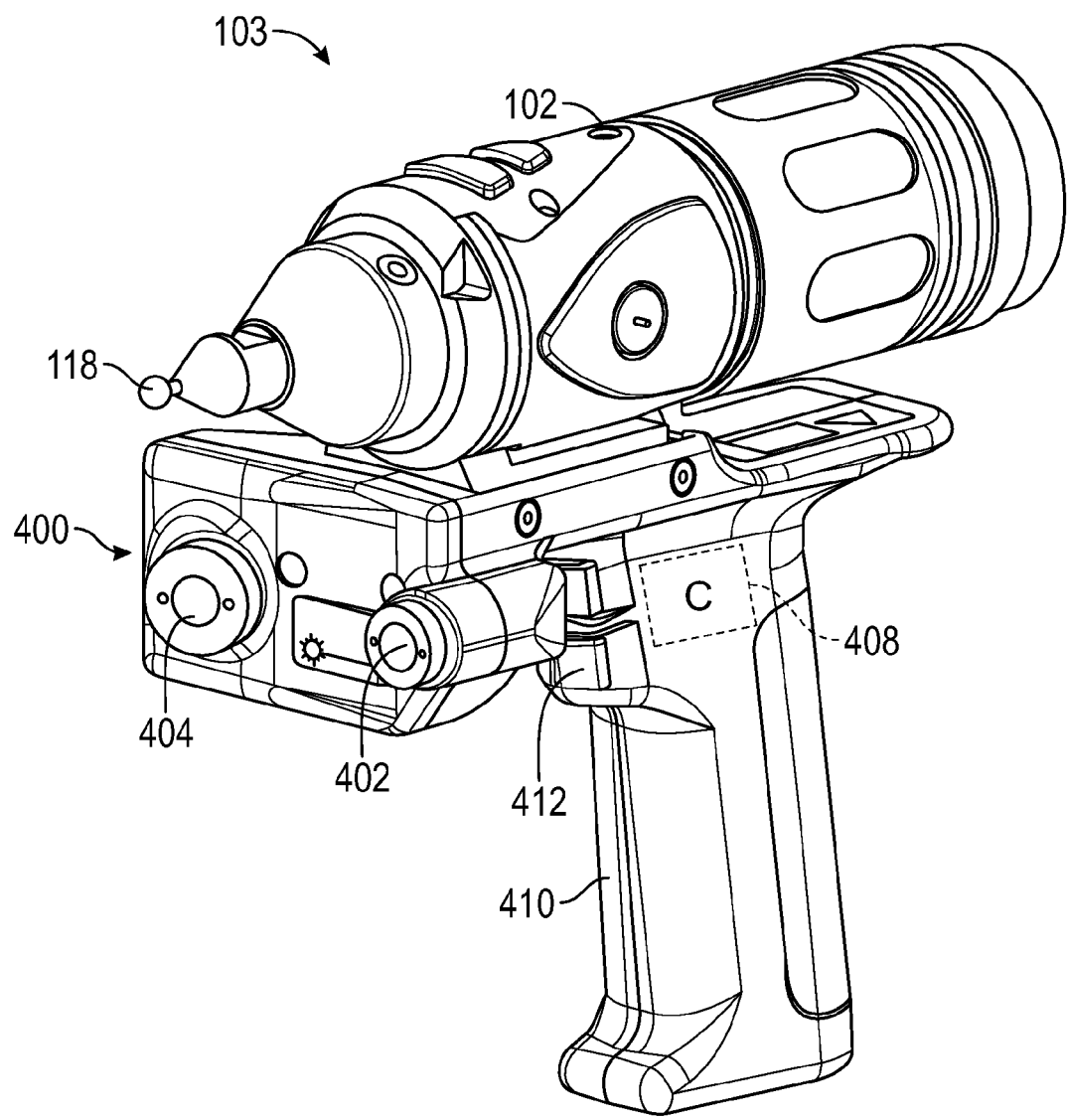
FIG. 12 and FIG. 13 are perspective views illustrating the probe end 103 with non-contact measurement devices attached.
Figure 13:
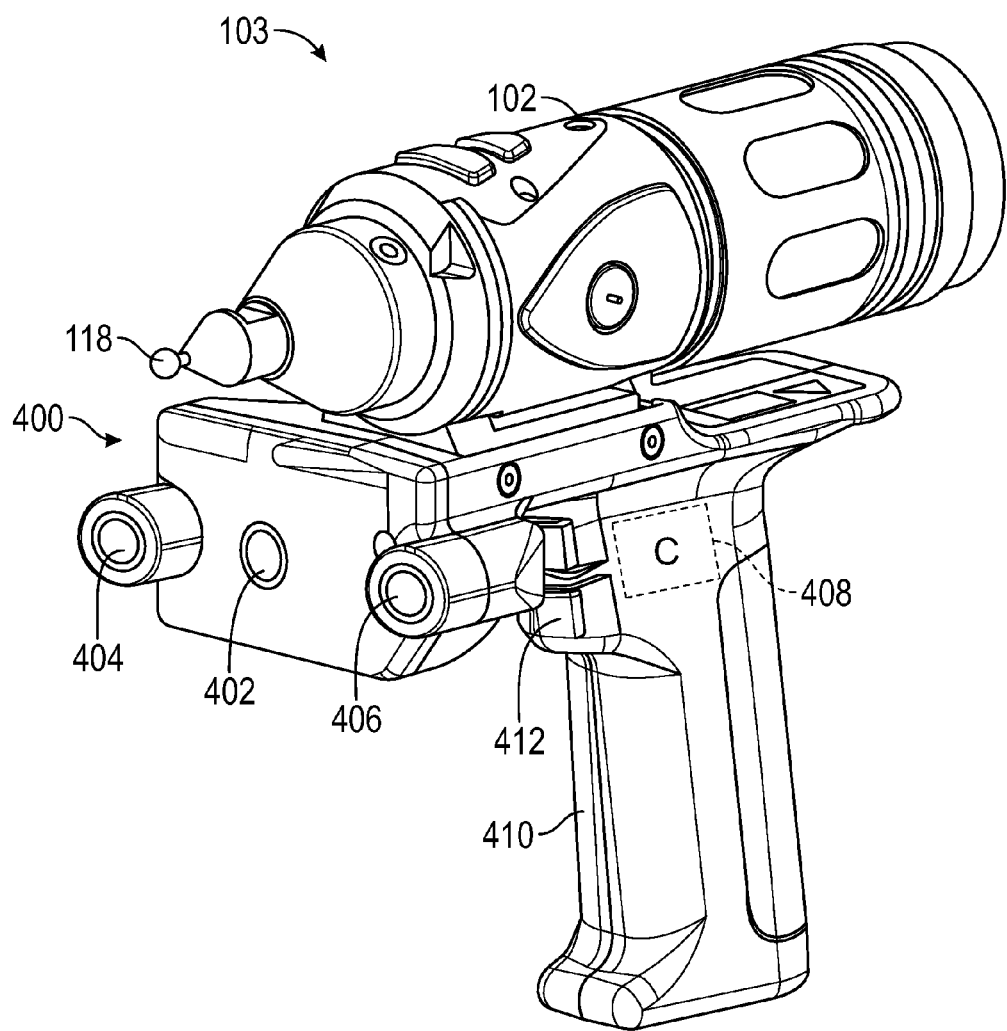

The probe 118 is detachably mounted to the measurement probe housing 102, which is connected to bearing cartridge grouping 112. A handle 126 is removable with respect to the measurement probe housing 102 by way of, for example, a quick-connect interface (FIG. 10). As will be discussed in more detail below, the handle 126 may be replaced with another device configured to provide non-contact distance measurement of an object, thereby providing advantages in allowing the operator to make both contact and non-contact measurements with the same AACMM 100. In one embodiment, the non-contacting measurement device may be a laser line probe or structure light image scanner 400 (FIGS. 12-13). In exemplary embodiments, the probe 118 is a contacting measurement device and is removable. The probe 118 may have different tips that physically contact the object to be measured, including, but not limited to: ball, touch-sensitive, curved and extension type probes. In other embodiments, the measurement is performed, for example, by a non-contacting measurement device such as an interferometer or an absolute distance measurement (ADM) device. In an embodiment, the handle 126 is replaced with the laser line probe or the coded structured light scanner device using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example. In some embodiments, a combination of the foregoing measurement devices may be coupled to the AACMM 100 simultaneously.

As shown in FIGS. 1 and 2, the AACMM 100 includes the removable handle 126 that provides advantages in allowing accessories or functionality to be changed without removing the measurement probe housing 102 from the bearing cartridge grouping 112. As discussed in more detail below with respect to FIG. 6, the removable handle 126 may also include an electrical interface that allows electrical power and data to be exchanged with the handle 126 and the corresponding electronics located in the probe end 103.

In various embodiments, each grouping of bearing cartridges 110, 112, 114 allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 (582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes: a base processing system that processes the data from the various encoder systems within the AACMM 100 as well as data representing other arm parameters to support three-dimensional (3-D) positional calculations; and a user interface processing system, an optional display, and resident application software that allows for operation of the AACMM 100. In one embodiment, the application software allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a noncontact distance measurement device that can be mounted to the removable handle 126 on the AACMM 100). The electronics that support these peripheral hardware devices or features may be located in each of the bearing cartridge groupings 110, 112, 114 located within the portable AACMM 100.

Figure 3:
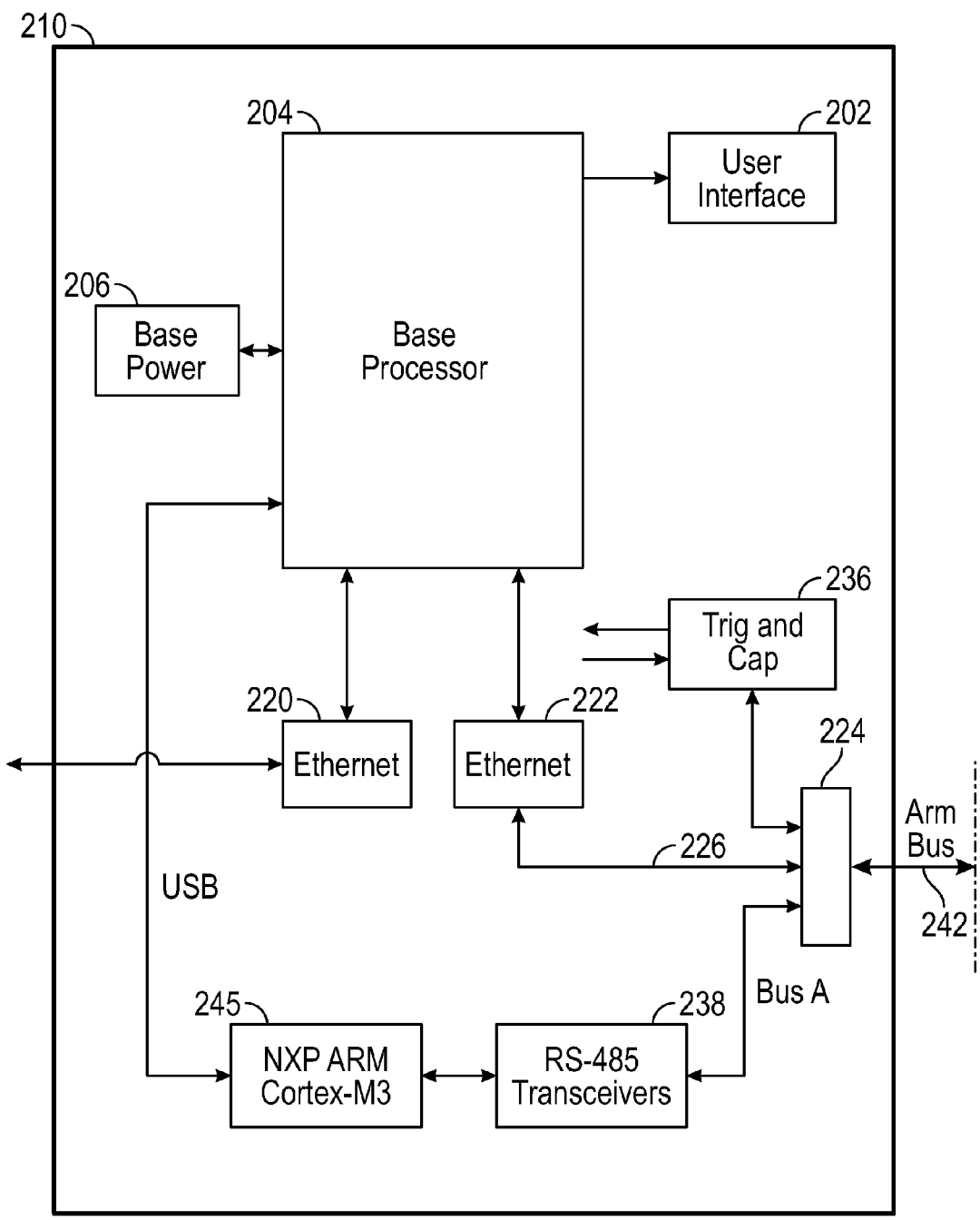
FIG. 3, is a block diagram of electronics data processing system utilized as part of the AACMM of FIG. 1 in accordance with an embodiment.

FIG. 3 is a block diagram of electronics inside base 116 utilized in an AACMM 100 in accordance with an embodiment. The embodiment shown in FIG. 3 includes an electronic data processing system 210 including a base processor 204 for implementing the base processing system, a user interface board 202, and a base power board 206 for providing power. The electronic data processing system 210 may further include wireless communications circuits, such as a Bluetooth module or a Wifi module (not shown). The user interface board 202 may include a computer processor for executing application software to perform user interface, display, and other functions described herein.

In the exemplary embodiment, the electronic data processing system 210 includes a first Ethernet communications module 220 that allows the base processor 204 to communicate with external devices, such as via a local area network for example. The electronic data processing system 210 further includes a second Ethernet communications module 222. The Ethernet module 222 is coupled for communication with an interface 224 that connects the Ethernet module 222 to an arm bus 242 that forms a direct communications circuit between a device (e.g. probe 118 or a noncontact measurement device) located on the end of the arm 104 and the electronic data processing system 210. As will be discussed in more detail herein, the connection 226 allows for communication via Gigabit Ethernet communications protocol. The interface 224 further connects the arm bus 218 with a trigger and capture module 236 that accepts signals from the probe end 103 related to the actuation of buttons and the capturing of coordinate data. The interface 224 further connects the arm bus 218 with an RS-485 transceiver 238. As will be discussed in more detail herein, the transceiver 238 receives signals from a first bus that is coupled to each of the encoders within the articulated arm. In one embodiment, the signals received by the transceiver 238 are transmitted by a module 245 to the base processor 204 via a universal serial bus (USB) connection.

Figure 4:
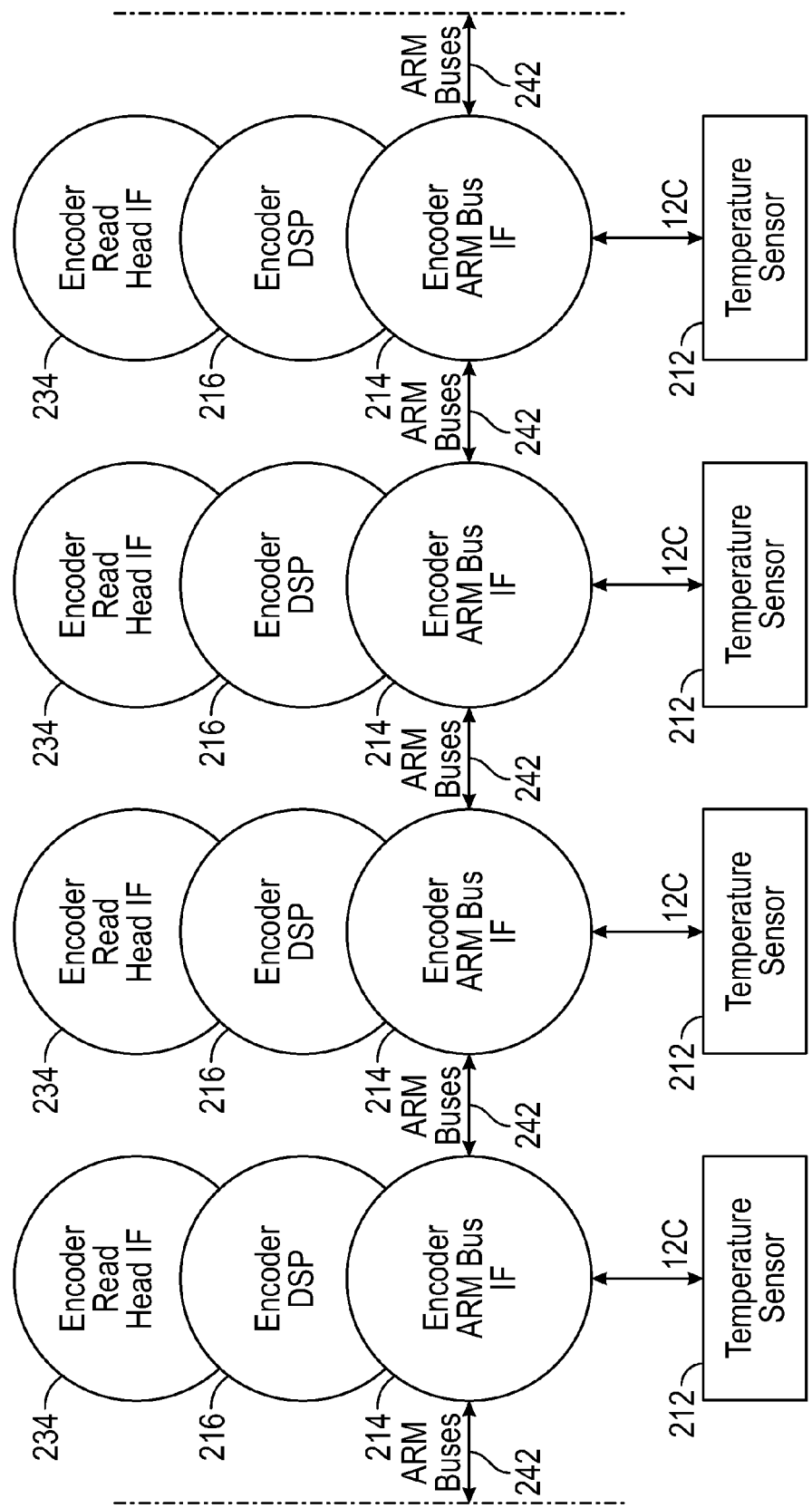
FIG. 4 and FIG. 5 are block diagrams of an encoder assembly for the articulated arm of the AACMM of FIG. 1 in accordance with an embodiment of the invention.
Figure 5:
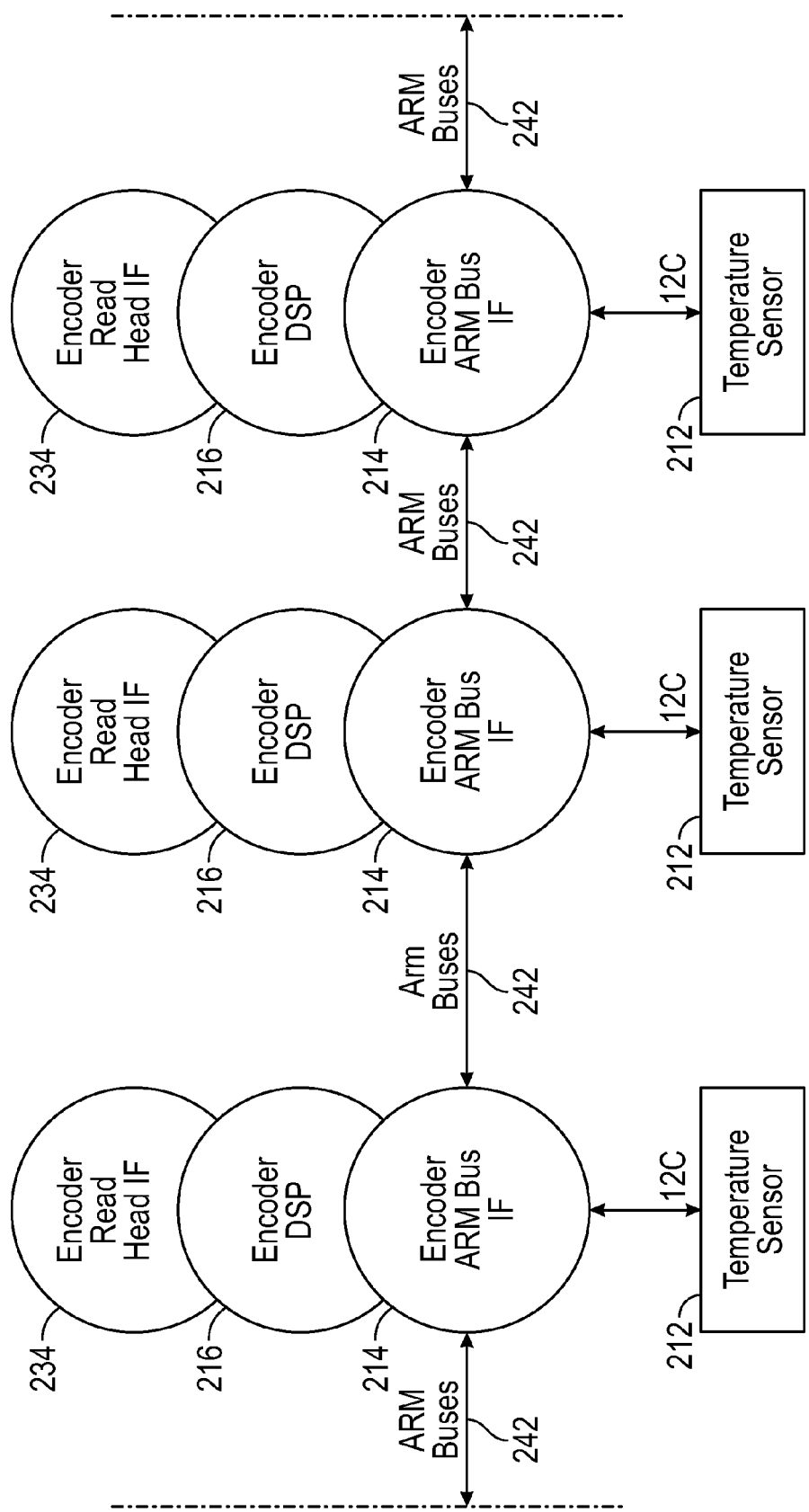

The electronic data processing system 210 is in communication with the aforementioned plurality of encoder systems via a portion of the bus 218. As will be discussed in more detail below, in the exemplary embodiment, each of the encoder systems is coupled to a first bus 242 that communicates data using the RS-485 protocol. In the embodiment depicted in FIG. 4 and FIG. 5, each encoder system generates encoder data and includes: an encoder arm bus interface 214, an encoder digital signal processor (DSP) 216, an encoder read head interface 234, and a temperature sensor 212. Other devices, such as strain sensors, may be attached to the encoder arm bus interface 214.

Figure 6:
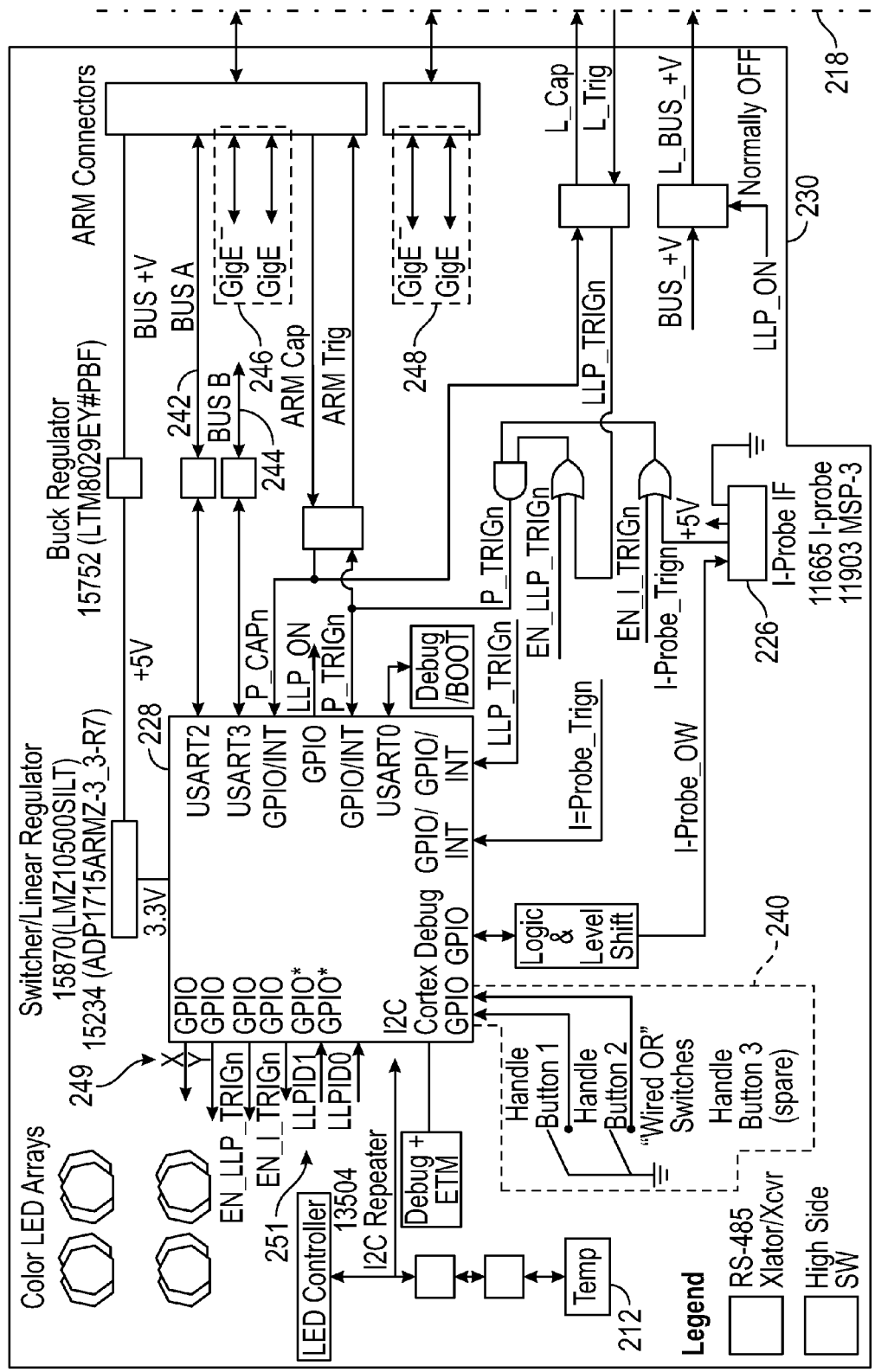
FIG. 6 is a block diagram of the probe end electronics of the AACMM of FIG. 1.
Figure 11:
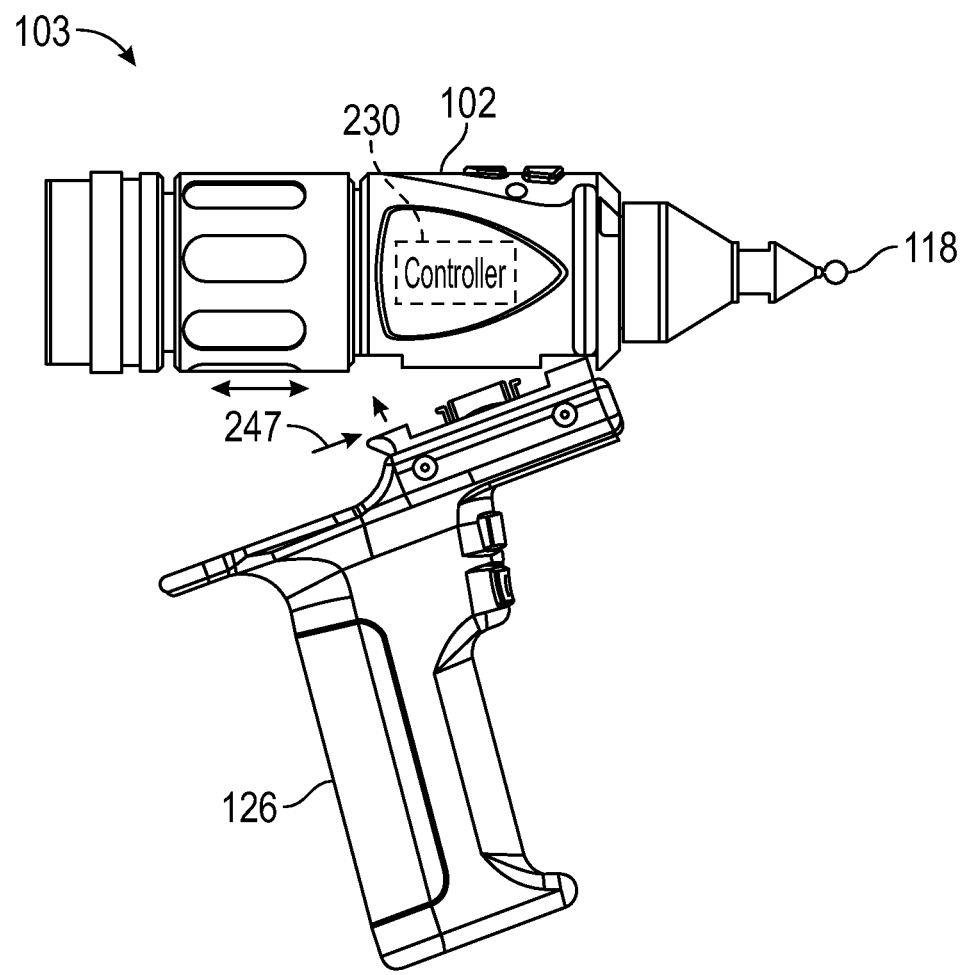
FIG. 11 is a side illustration of the probe end with the handle partially disassembled in accordance with an embodiment of the invention.

Now referring to FIG. 6, the probe end electronics 230 are in communication with the arm bus 218. The probe end electronics 230 include a probe end processor 228, a temperature sensor 212, a handle/button interface 240 that connects with the handle 126 or the noncontact distance measurement device 400 via the quick-connect interface in an embodiment, and a probe connection 226. The quick-connect interface 247 (FIG. 11) allows access by the handle 126 to the data bus, control lines, and power bus used by the noncontact distance measurement device 400 and other accessories. In an embodiment, the probe end electronics 230 are located in the measurement probe housing 102 on the AACMM 100. In an embodiment, the handle 126 may be removed from the quick-connect interface 247 (FIG. 11) and measurement may be performed by the noncontact distance measurement device 400 communicating with the probe end electronics 230 of the AACMM 100 via the arm bus 218. The quick-connect interface 247 may be the same as that described in commonly owned United States Patent Publication 2013/0125408, the contents of which are incorporated herein by reference. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe connection 226 may connect with the probe end processor 228 by any suitable communications protocol, including commercially-available products from Maxim Integrated Products, Inc. that embody the 1-Wire® communications protocol.

Figure 7:
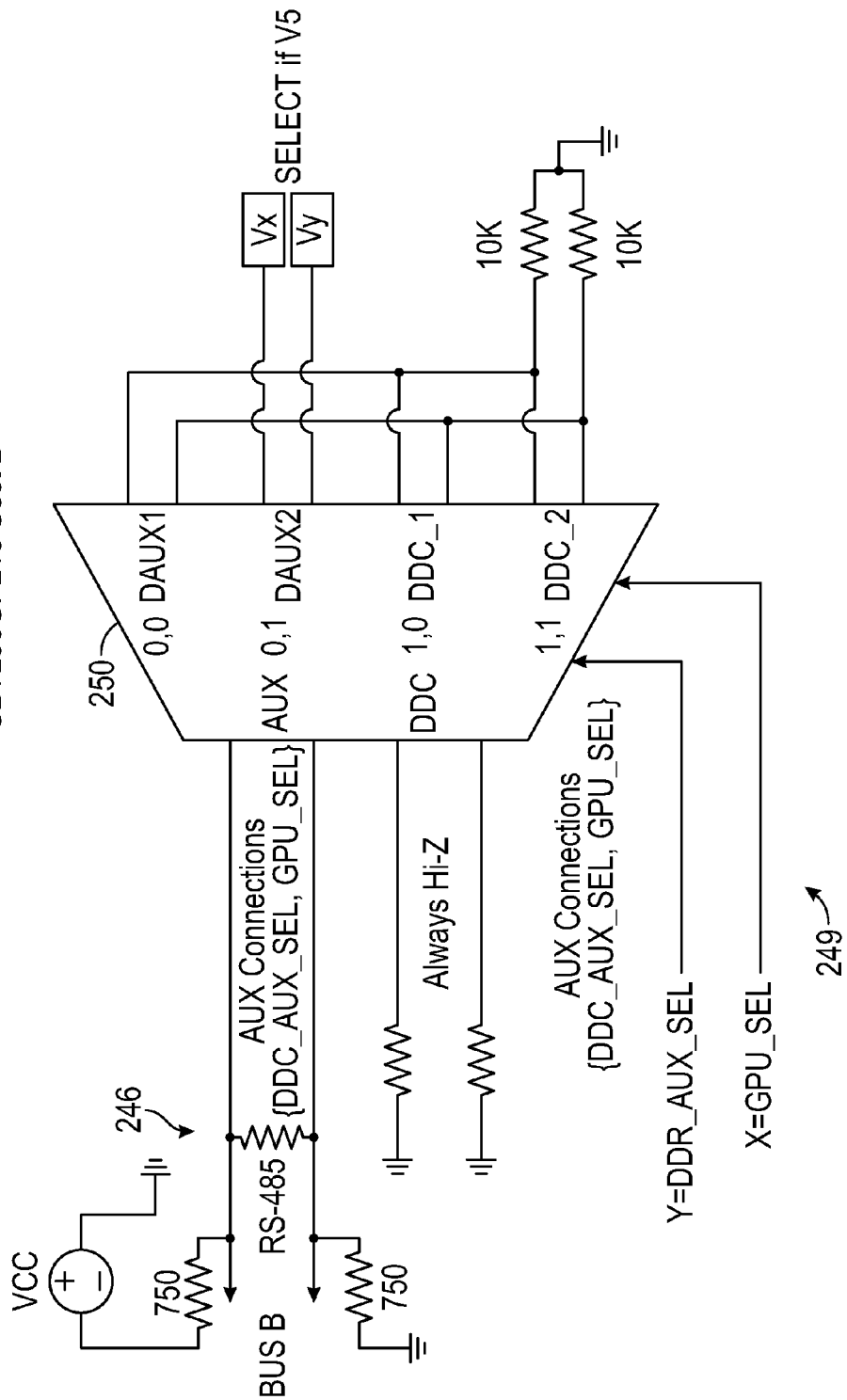
FIG. 7 is a schematic diagram of a portion of the probe end electronics of FIG. 6.

As discussed above, the arm bus 218 is comprised of a plurality of busses that may be selectively configured to cooperate and operate under different communications protocols. In the exemplary embodiment, the arm bus 218 is a logical data bus comprised of a first bus 242, a second bus 244, a third bus 246. The first bus 242 is a two wire bus that is configured to operate using the RS-485 communications protocol. The first logical data bus or "A" bus 242 is coupled between the processor 228 and the electronic data processing system 210 and each encoder arm bus interface 214. In this way, the first bus 242 transmits encoder data that allows the electronic data processing system to determine the position and orientation of the probe end 103 and thus the coordinates of a measured point or points. The second logical data bus or "B" bus 244 is also a two-wire bus. Referring to FIG. 7 with continuing reference to FIG. 6, the third logical data bus or "C" bus 246 is selectively coupled using X and Y signals 249 by a switch 250 to allow direct transmission of data from the combined Bus B 244 and Bus C 246 to the processor 228. The X and Y signals 249 may be generated by the processor in response to receiving LLPID0 and LLPID1 signals 251 from the attached accessory device, such as the laser line probe. The LLPIP0 and LLPIP1 signals 251 are transmitted by the accessory device to facilitate identification of the accessory device by the processor 228. In the exemplary embodiment, the accessory identification data may be subsequently relayed to the base processor 204 via bus 242. When the LLPID0 and LLPID1 signals 251 identify an accessory device which supports 10/100 Ethernet, the switch 252 defines a connection from the accessory device (i.e. LLP) to allow signals from the accessory device to be transmitted directly to bus 246 without first transmitting through processor 228.

In other embodiments, the X and Y signals 249 may be generated by the base processor 204 and transmitted to the switch 250. In one embodiment, the signals 249 may be transmitted by the base processor 204 in response to an input by the operator via an AACMM user interface. In still other embodiments, the LLPID0 AND LLPID1 signals 251 may be transmitted directly from the accessory device (i.e. LLP) to the switch 250. It should be appreciated that advantages may be gained by receiving the signals 251 with the processor 228 in that testing may be performed prior to providing a direct connection between the accessory device and the bus 246.

It should be appreciated that while the first bus 242 is capable of transferring data at 6.25 Mb/s, the logical bus formed by the combination of the second bus 244 up to 100 Mb/s using the 10/100 Ethernet communications protocol. Such an increase in capacity may be desired for some accessory devices, such as the laser line probe 300 for example, which acquires an increased amount of data when compared with a touch probe.

Figure 8:
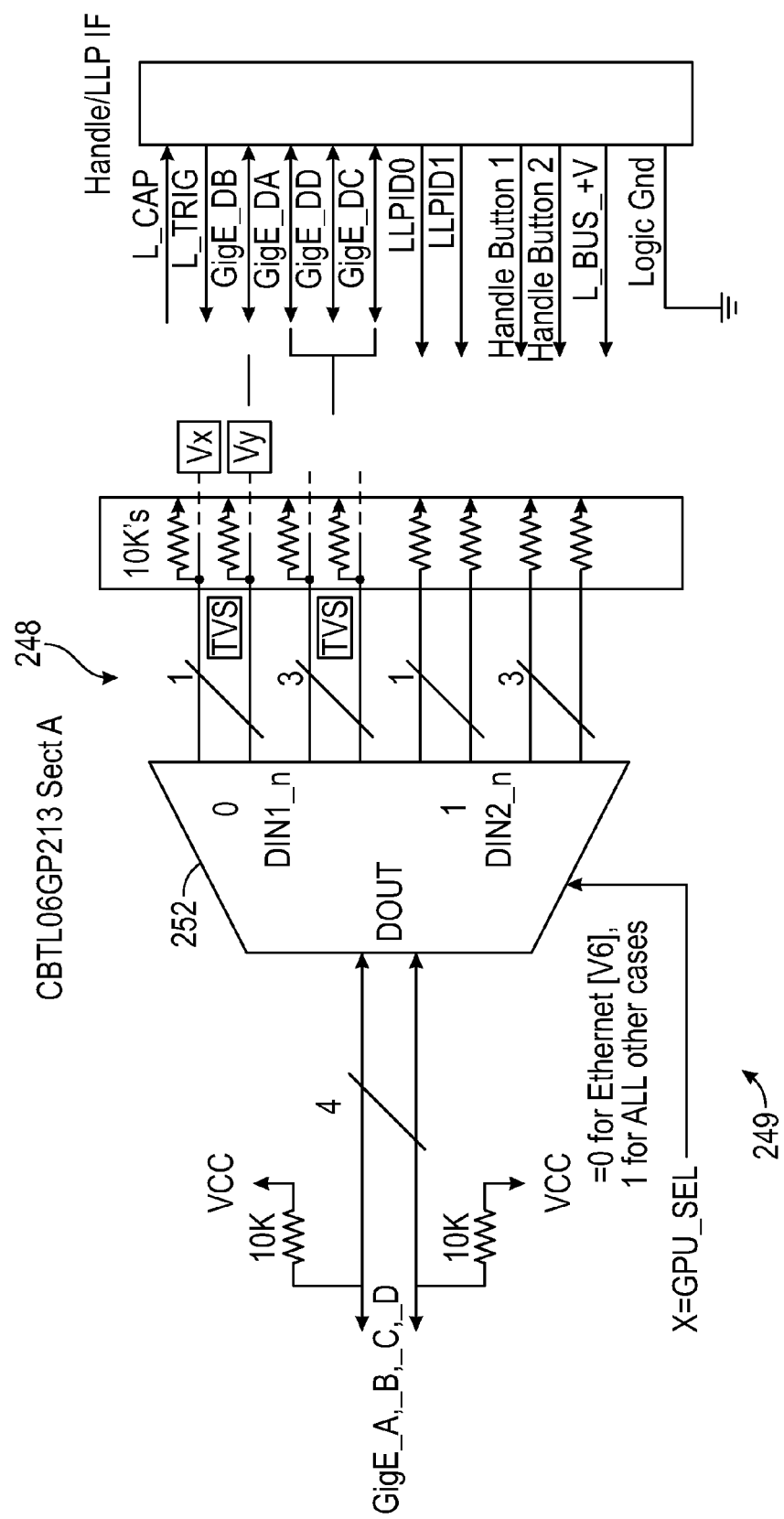
FIG. 8 is a schematic diagram of another portion of the probe end electronics of FIG. 6.

The fourth or "D" bus 248 is a four-wire bus. Referring now to FIG. 8 with continuing reference to FIG. 6, the fourth bus 248 is connected to a second switch 252 that selectively configures the fourth bus 248 to cooperatively operate with the second bus 244 and third bus 246 (which are selectively coupled via switch 252) to define a logical eight-wire bus that is configured to communicate using the Gigabit Ethernet protocol. It should be appreciated that the logical eight-wire bus is capable of transferring data at a rate of up to 1 Gb/s. It is anticipated that in operation the logical eight-wire bus will operate at a data transfer rate of about 500 Mb/s. This increased capacity may be desirable with certain accessories coupled to the probe end 103, such as non-contact measurement devices that capture image data at high resolutions, video cameras or multiple accessories coupled to the probe end and operated simultaneously.

In operation, the activation of the switches 250, 252 may be in response to a signal from the electronic data processing system 210 or the probe end processor 228. In one embodiment, the activation of the switches 250, 252 may be in response to an input by an operator, such as through user interface board 202 for example, indicating that a particular accessory device has been coupled to the probe end 103. In another embodiment, the probe end processor 228 detects the connection of an accessory device capable of transmitting large amounts of data and activates the switches 250, 252 to configure a logical bus that is appropriate for the connected accessory device. It should be appreciated that the activation of the switches 250, 252 may be in response to a signal from the probe end processor 228, based on LLPID0 and LLPID1, the base processor 204 or a combination of the foregoing. One advantage of switches 250, 252 is that it allows the selective creation of logical buses to provide backwards compatibility with accessories to match the communications protocol utilized by that accessory device.

In the exemplary embodiment, the articulated arm 100 includes one or more slip ring devices that are configured to transmit electrical power and data across a rotational joint, such at each cartridge grouping 110, 112, 114. In one embodiment, the cartridge grouping 110 includes two slip ring devices, cartridge grouping 112 may include one slip ring device (6-axis AACMM) or two slip ring devices (7-axis AACMM), while the cartridge grouping 114 includes three slip ring devices. It should be appreciated that the bus 218 traverses each of these rotational joints. In one embodiment, each slip ring device is configured to transfer 18 connections (wires). These connections include six connections for the first bus 242, second bus 244 and third bus 246 and four connections for the fourth bus 248. In addition, there are eight connections for electrical power, capture and trigger. In the exemplary embodiment, the eighteen connections are divided into two connectors. An exemplary slip ring device is model number SRA-73820-1 manufactured by Moog, Inc.

Figure 9:
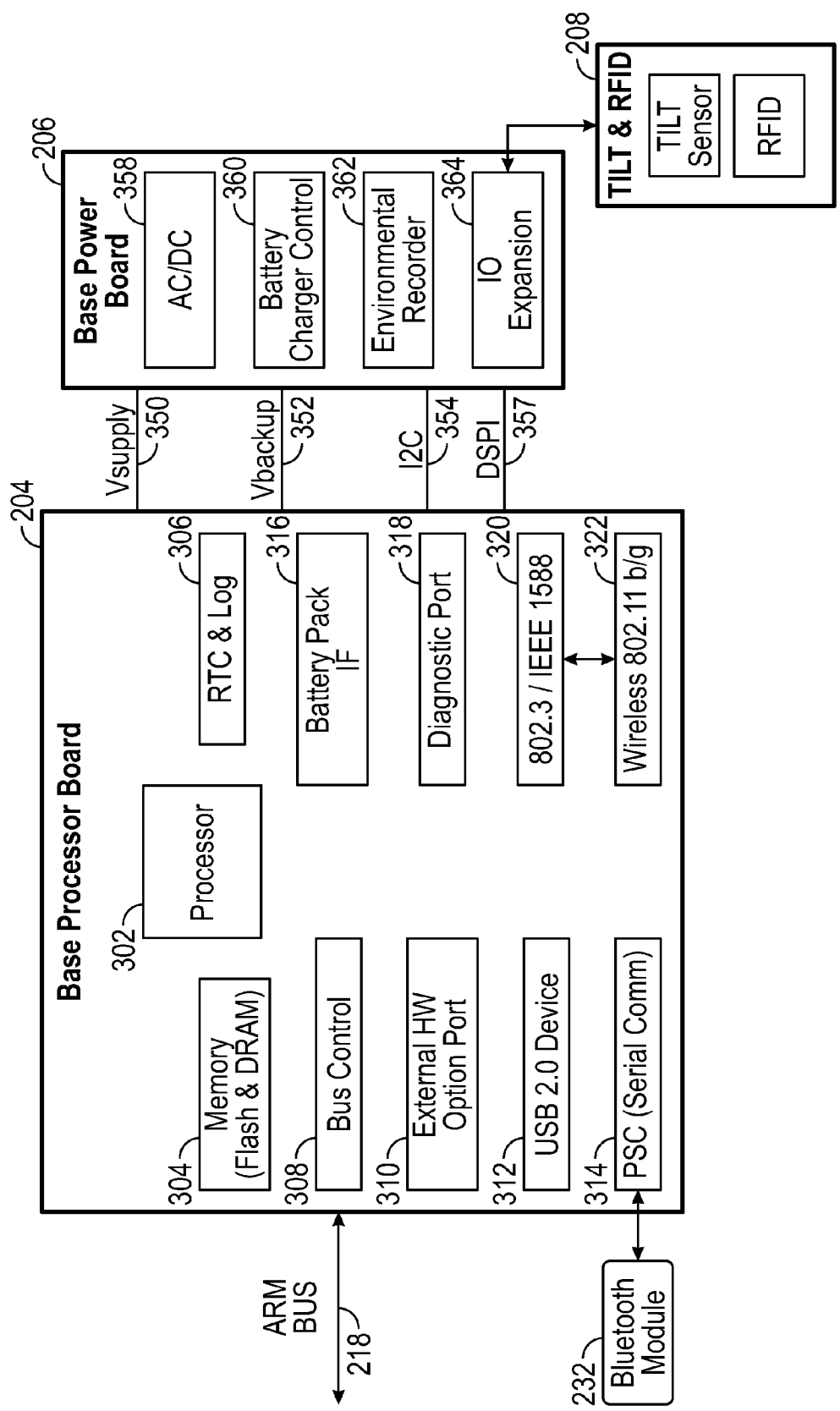
FIG. 9 is a block diagram of the electronic data processing system in accordance with an embodiment of the invention.

In one embodiment shown in FIG. 9, the base processor board 204 includes the various functional blocks. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories. A real time clock (RTC) and log 306 and a diagnostic port 318 are also included in the functionality in an embodiment of the base processor board 204 depicted in FIG. 9.

The base processor board 204 also manages all the wired and wireless data communication with external (host computer) and internal (user interface board 202) devices. The base processor board 204 has the capability of communicating with an Ethernet network via an Ethernet function 320, with a wireless local area network (WLAN) via a IEEE 802.11 LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. In an embodiment, the base processor 204 also sends the raw measurement data to an external computer.

The electronic data processing system 210 shown in FIG. 9 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

In one embodiment shown in FIG. 10, the base power board 206 includes an input filter 366 that receives power from an energy source 367 (e.g. a wall outlet) and transfers the electrical power to the battery charger control 360. In this embodiment, the battery charger control 360 is electrically coupled to a first energy storage device and a second energy storage device, such as first battery 368 and second battery 370. The battery charger control 360 is configured to transfer electrical power to (e.g. charge the batteries) and receive electrical power from the batteries 368, 370. Each of the batteries 368, 370 includes a processing circuit 372 that monitors the voltage, current drain, and battery temperature via sensors (not shown) in the respective battery 368, 370. The battery charger control 360 is further coupled to communicate with each processing circuit 372 via a SMBus (I2C) 374 to receive signals indicating the status of each battery 368, 370.

In one embodiment, the battery charger control 360 is configured to charge one or both of the batteries in response to a signal from the processors 372 when AC electrical power is present. In one embodiment, the battery charger control 360 (the dual battery smart charger 360) may be configured to charge or withdraw electrical power from one or both of the batteries 368, 370 to optimize a parameter, such as battery life or operation time, based on signals from the processors 372. The battery charger control 360 may further be configured to selectively withdraw electrical power from one or both of the batteries 368, 370. In one embodiment, the battery charger control 360 transmits battery data to the base processor 204.

In the exemplary embodiment, the batteries 368, 370 are each removably coupled to the AACMM 100. The batteries 368, 370 and the battery charger controller 360 may be configured to allow removal of one or both of the batteries during operation without interrupting the operation of the AACMM 100. When operating solely on battery power, one of the batteries 368, 370 may be removed while the AACMM 100 is operated using electrical power from the other battery (e.g. hot swappable). It should be appreciated that this dual battery arrangement provides a number of advantages in that the batteries provide a redundant power source for the AACMM 100 in the event that AC electrical power from the energy source 367 is removed or otherwise lost. The dual battery arrangement also provides advantages in allowing extended, uninterrupted, operation under battery power since as batteries are drained/depleted, the depleted battery may be removed and replaced with a new fully charged battery. In this way, so long as replacement batteries are available, operation under battery power may extend indefinitely. Further, advantages may be gained in extending the useful life of the batteries 368, 370 by operating the battery charger control 360 to lower the average current withdrawn from each battery during operation.

Electrical power is transferred from the battery charger control 360 to a conditioning module 376 that also interfaces with a power actuator 378. The power actuator 378 allows the operator to selectively turn the AACMM 100 on or off. The power conditioning module 376 transfers a portion of the electrical power to the environmental recorder 362. The remaining electrical power is transferred to a buck-boost module 380 and a buck regulator module 382, which adapt the electrical power to have characteristics suitable for use by the electronic data processing system 210.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Referring now to FIGS. 12-13, an exemplary embodiment of a probe end 103 is illustrated having a measurement probe housing 102 with a quick-connect mechanical and electrical interface that allows removal and interchangeability of accessory devices, such as non-contact measurement devices 400. In one embodiment, the device 400 is removably coupled to the probe end 103 via the coupler mechanism and interface 426. In another embodiment, the device 400 is integrally connected to the probe end 103. In the exemplary embodiment, the non-contact measurement device 400 may be a laser line probe or a structured light scanner having a single camera FIG. 12 or two cameras (FIG. 13). The device 400 may also be an interferometer, an absolute distance measurement (ADM) device, a focusing meter or another type of non-contact distance measurement device.

The device 400 includes an electromagnetic radiation transmitter, such as a light source 402 that emits coherent or incoherent light, such as a laser light or white light for example. The light from light source 402 is directed out of the device 400 towards an object to be measured. In one embodiment the device 400 has a single camera 404 (FIG. 12) and in another embodiment has two cameras 404, 406. Each of the cameras may include an optical assembly and an optical receiver. The optical assembly may include one or more lenses, beam splitters, dichromatic mirrors, quarter wave plates, polarizing optics and the like. The optical receiver is configured receive reflected light and the redirected light from the optical assembly and convert the light into electrical signals. The light source 402 and the cameras are both coupled to a controller 408. The controller 408 may include one or more microprocessors, digital signal processors, memory and signal conditioning circuits.

Further, it should be appreciated that the device 400 is substantially fixed relative to the probe tip 118 so that forces on the handle portion 410 do not influence the alignment of the device 400 relative to the probe tip 118. In one embodiment, the device 400 may have an additional actuator (not shown) that allows the operator to switch between acquiring data from the device 400 and the probe tip 118.

The device 400 may further include actuators 412 which may be manually activated by the operator to initiate operation and data capture by the device 400. In one embodiment, the optical processing to determine the distance to the object is performed by the controller 408 and the distance data is transmitted to the electronic data processing system 210 via bus 242. In another embodiment optical data is transmitted to the electronic data processing system 210 and the distance to the object is determined by the electronic data processing system 210. It should be appreciated that since the device 400 is coupled to the AACMM 100, the electronic processing system 210 may determine the position and orientation of the device 400 (via signals from the encoders) which when combined with the distance measurement allow the determination of the X, Y, Z coordinates of the object relative to the AACMM.

In the exemplary embodiment, the AACMM 100 is configured to transfer data between the device 400 and the electronic data processing system 210 via one of the buses 242, 244, 246, 248. The bus used will depend on the accessory device 400 that is coupled to the probe end 103. The electronic data processing system 210 or the processor 228 are configured to detect the device 400 and determine the data transfer rate desired for the connected device 400. Once the device 400 is detected, a signal is transmitted to one or both of the switches 250, 252 to create a logical bus having the data transfer and communications protocol characteristics desired for operation of the device 400 with the AACMM 100. It should be appreciated that the electrical power for operation of the device 400 may be provided by the base power board 206, such as from the batteries 368, 370, or from a power supply arranged internal to the device 400 (not shown). In still another embodiment, the device 400 may be powered via an external power cable.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for measuring three-dimensional coordinates of an object in space, comprising:
   an portable articulated arm coordinate measuring machine (AACMM) in a AACMM frame of reference having an origin, the AACMM having a manually positionable arm portion, a base, a noncontact measurement device, and an electronic circuit, the arm portion having an opposed first end and second end, the arm portion including a plurality of connected arm segments, each of the plurality of connected arm segments including at least one position transducer for producing a plurality of position signals, the first end connected to the base;
   a first electronic circuit configured for receiving the plurality of position signals from the at least one position transducer and for providing data corresponding to a position of the noncontact measurement device, the first electronic circuit having a first processor;
   a second electronic circuit disposed within the second end, the second electronic circuit having a second processor, a first communications switch and a second communications switch;
   a first data bus coupled between the first electronic circuit and the second electronic circuit, the first data bus configured to operate on a first communications protocol;
   a second data bus coupled between the first electronic circuit and the second electronic circuit;
   a third data bus coupled between the first communications switch and the first electronic circuit;
   a fourth data bus coupled between the second communications switch and the first electronic circuit;
   the non-contact measurement device coupled to the second end and electrically coupled to the second electronic circuit; and
   wherein the first communications switch and the second communications switch are configured to operably couple the second data bus, the third data bus and the fourth data bus into a single logical data bus in response to a second signal, the single logical data bus configured to operate on a second communications protocol, the second communications protocol being different than the first communications protocol.

2. The system of claim 1 wherein the second processor is configured to transmit the second signal to the first communications switch and the second communications switch.

3. The system of claim 1 wherein the first processor is configured to transmit the second signal to the first communications switch and the second communications switch.

4. The system of claim 1 wherein the first communications protocol is RS-485 communications protocol.

5. The system of claim 4 wherein the second communications protocol is Gigabit Ethernet communications protocol.

6. The system of claim 1 wherein the first communications switch is configured to operably couple the second data bus and the third data bus into a second logical data bus in response to a third signal, the second logical data bus configured to operate on a third communications protocol, the third communications protocol being different than the first communications protocol.

7. The system of claim 6 wherein the third communications protocol is an Ethernet communications protocol.

8. A method of operating a portable articulated arm coordinate measuring machine (AACMM) for measuring three-dimensional coordinates of an object in space, comprising:

provc a method providing the AACMM in a AACMM frame of reference having an origin, the AACMM having a manually positionable arm portion, a base, a noncontact measurement device, and an electronic circuit, the arm portion having an opposed first end and second end, the arm portion including a plurality of connected arm segments, each of the plurality of connected arm segments including at least one position transducer for producing a plurality of position signals, the first end connected to the base;

providing a first electronic circuit configured for receiving the plurality of position signals from the at least one position transducer and for providing data corresponding to a position of the noncontact measurement device, the first electronic circuit having a first processor;

providing a second electronic circuit disposed within the second end, the second electronic circuit having a second processor, a first communications switch and a second communications switch;

providing a first data bus coupled between the first electronic circuit and the second electronic circuit, the first data bus configured to operate on a first communications protocol;

providing a second data bus coupled between the first electronic circuit and the second electronic circuit;

providing a third data bus coupled between the first communications switch and the first electronic circuit;

providing a fourth data bus coupled between the second communications switch and the first electronic circuit;

coupling an accessory device to the second end;

receiving a first identification signal at the first communications switch and the second communications switch; and switching the first communications switch and the second communications switch to couple the second data bus, the third data bus and the fourth data bus into a single logical data bus in response to the first identification signal, the single logical data bus configured to operate on a second communications protocol, the second communications protocol being different than the first communications protocol.

9. The method of claim 8 further comprising transmitting a second identification signal from the accessory device to the second processor in response to coupling the accessory device to the second end.

10. The method of claim 9 further comprising transmitting the first identification signal from the second processor to the first communications switch and the second communications switch.

11. The method of claim 8 further comprising transmitting the first identification signal from the first processor to the first communications switch and the second communications switch.

12. The method of claim 8 further comprising transmitting first data via the first data bus using the first communications protocol, the first communications protocol being an RS-485 communications protocol.

13. The method of claim 12 further comprising transmitting second data via the single logical data bus using the second communications protocol, the second communications protocol being a Gigabit Ethernet communications protocol.

14. The method of claim 13 further comprising forming a direct communications circuit from the accessory device to the single logical data bus.

15. The method of claim 14 further comprising transmitting data directly from the accessory device to the first processor via the single logical data bus.

16. The method of claim 8 further comprising receiving a third identification signal at the first communications switch.

17. The method of claim 16 further comprising switching the first communications switch to couple the second data bus and the third data bus into a second logical data bus in response to the third identification signal, the second logical data bus configured to operate on a third communications protocol, the third communications protocol being different than the first communications protocol.

18. The method of claim 17 further comprising transmitting third data via the second logical data bus using the third communications protocol, the third communications protocol being a Ethernet communications protocol.

* * * * *